Aug. 26, 1930. F. G. CREED ET AL 1,773,957
SPEED GOVERNOR SWITCH
Filed Jan. 14, 1927
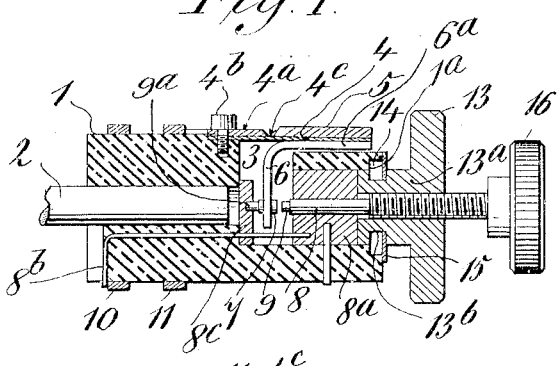
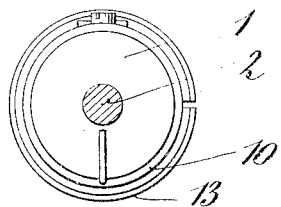

Patented Aug. 26, 1930

1,773,957

UNITED STATES PATENT OFFICE

FREDERICK GEORGE CREED AND REGINALD DENNIS SALMON, OF CROYDON, ENGLAND, ASSIGNORS TO CREED AND COMPANY LIMITED, A COMPANY OF GREAT BRITAIN

SPEED-GOVERNOR SWITCH

Application filed January 14, 1927, Serial No. 161,131, and in Great Britain February 26, 1926.

This invention has reference to speed governors of the kind adapted to open and close an electric circuit between two contacts and which are specially adapted for controlling the speed of electric motors used in connection with telegraph apparatus but which are suitable also for other purposes. The invention has for its object to provide a speed governor suitable for the purpose mentioned, that shall be simple in construction and efficient in use, in which motion between the contacts other than that due to difference in speed of revolution of the governor, shall be prevented, in which there shall be no relative rotary motion between the contacts and in which the speed of rotation of the motor controlled by the governor can easily be varied whilst the governor is in action. It also has for its object to enable the parts of the governor to be made light and sensitive so that the governor will function upon very slight differences in speed from a predetermined normal speed.

For this purpose, in a speed governor according to the invention and arranged to be driven by an electric motor, a spring controlled centrifugal weight carried by a rotary member is associated with a contact arranged in proximity to another contact that is carried by the rotary member and is normally stationary relatively thereto, the arrangement being such that when the speed of the motor falls below a given predetermined speed, the two contacts will be moved relatively to one another by the spring controlled centrifugal weight and alter the motor circuit in such manner as to bring about an increase in speed of the motor and when the speed of the motor rises above the predetermined speed, the two contacts will be moved relatively to one another in the opposite sense and alter the motor circuit in such manner as to bring about a reduction in speed of the motor, both contacts rotating at the same speed. When using a shunt wound electric motor, the two contacts may be moved apart to open a circuit between them and leave a resistance in circuit with the field winding of the motor when the speed of the motor falls below the predetermined speed, and be caused to bear against each other to close the said circuit and short circuit the said resistance when the speed exceeds the predetermined speed. When using a series wound electric motor, the contacts may be caused to bear against each other when the speed of the motor falls below the predetermined speed and short circuit a resistance in the motor circuit and to move apart when the speed exceeds the predetermined speed and open the said short circuit.

To admit of the normal speed of rotation of the motor being varied, the normally stationary contact is made capable of adjustment in relation to the other contact by adjusting means arranged co-axially with the rotary member of the governor so that it can readily be actuated whilst the governor is running.

When using a shunt wound motor, the rotary member is provided with a second relatively stationary contact, hereinafter referred to as a back contact, against which the movable contact will bear when the governor and motor are stationary and act to short circuit the field resistance of the motor and thus enable the motor to start under full power. Then, as the speed of the motor increases, the moving contact will move away from the back contact and towards the adjustable front contact. By these means, any liability of the motor burning out, due to the motor failing to start up when required, owing to a weakened field, is avoided. When the governor is designed to work with a series wound motor, the back contact is not necessary.

A speed governor, embodying the invention, can be variously constructed.

In the accompanying illustrative drawings, Figs. 1, 2 and 3 show in longitudinal section, end elevation and plan respectively, one construction of speed governor suitable for use with a shunt wound motor having a resistance winding in series with the shunt field winding. Fig. 3ª is a detail view. Fig. 4 shows, diagrammatically, such a governor connected in circuit with a shunt wound motor. Fig. 5 is a similar view to Fig. 1 showing a construction of speed governor suitable for use with a series wound motor and Fig. 6 is a diagrammatic view showing such a governor connected in circuit with a series wound motor.

In the example shown in Figs. 1 to 4 inclusive, 1 is the rotary member of the governor adapted to be fixed to an overhanging portion of a driving shaft 2 and formed at an intermediate portion of its length with a transverse gap 3, the shaft being driven from the motor the speed of which is to be governed. To the portion of the rotary member 1 located at that side of the gap which is fixed to the shaft 2, is fixed one end of a spring blade 4 the other end of which is free and carries a weight 5 to form the centrifugal member of the governor. To the spring blade 4 is connected an arm 6 that extends into the gap 3 and carries an electric contact 7 arranged co-axially with the axis of the shaft 2 or nearly so. The fixed end portion of the spring blade 4 is clamped against the rotary member 1 by a plate $4^a$ under the action of a screw $4^b$ and the movable end portion of the spring blade is clamped between the weight 5 and the adjacent portion $6^a$ of the contact carrying arm 6 so that it is rendered rigid and the spring blade can turn only about the intermediate portion $4^c$ of its length which forms a frictionless pivot. As a result, the movement of the contact carrying arm 6 will take place about the pivotal portion $4^c$ of the spring blade and will be proportional to the outward turning movement of the centrifugal weight. In the portion of the rotary member 1 at the opposite side of the gap 3, is an endways co-axially arranged adjustable but normally fixed rod 8 carrying a contact 9 that extends into the gap 3 and terminates in proximity to the other co-axially arranged contact 7. The two contacts 7 and 9 are suitably insulated from each other, it may be by making the rotary member 1 of insulating material, and are respectively connected to two insulated slip rings 10 and 11 carried by the said rotary member, or, it may be by the shaft 2, and upon which bears two brushes $10^a$, $11^a$ connected to the circuit to be controlled. In the example, the rod 8 is of metal and extends through a metal plug $8^a$ fixed in the member 1 of insulating material and connected by a conductor $8^b$ to the slip ring 10. In the case of the shunt wound motor 12 (Fig. 4) now being referred to, the two brushes are connected to the two ends of a resistance $12^a$ in the field circuit $12^b$ of the motor. The arrangement is such that when the speed of the motor rises above the predetermined speed, the contacts 7 and 9 will be caused to bear against each other by the action of the centrifugal weight 5 so as to short circuit the resistance $12^a$ and thus reduce the speed of the motor 12, and when the speed falls below the predetermined speed, the said contacts 7 and 9 will be moved apart by the spring blade 4 so that the said resistance $12^a$ will not then be short circuited and the speed of the motor will be increased.

$9^a$ is a relatively stationary back contact electrically connected to the conductor $8^b$ and against which the movable contact 7 will bear, for the purpose hereinbefore explained, when the motor and governor are at rest.

To permit the rod 8 and the contact 9 carried thereby to be easily adjusted in an endways direction whilst the said member 1 is rotating, the rod may be screw threaded externally for part of its length as shown, and extend through a nut 13 having a corresponding internally screw threaded hole, the nut being connected to the rotary body 1 so that it can be turned relatively thereto when desired but cannot move endways. For this purpose, the nut 13, which may, as shown, be formed with an external circular flange $13^a$, may be formed with an annular recess $13^b$ into which extends the two halves of a divided ring 14 which are retained in an endways position in a recess $1^a$ in the rotary member 1, as by a spring plate 15 fixed to the free end of the rotary member. To the outer end of the screw threaded rod 8 is fixed a disc or knob 16. This construction prevents any possible endways movement of the nut 13 relatively to the rotary member 1. It is important that the adjacent abutting faces of the plug $8^a$ and nut 13 should be flat and smooth and in a plane at right angles to the axis of the rotary member 1. The arrangement is such that by holding the flanged nut 13 and rotating the rod 8 by its disc or knob 16, the contact 9 carried by the rod can easily be adjusted endways relatively to the other contact 7 for the purpose mentioned, if need be whilst the rotary member 1 is rotating. To prevent any possible endways movement of the rod 8 in the nut, due for instance to the screw not accurately fitting the nut, the nut may be formed with a diametrically arranged slit $13^c$ (Fig. $3^a$) and be provided with a clamping screw $13^d$ by which it can be clamped to the screwed portion of the rod 8 so as to prevent looseness between the two parts whilst leaving the rod free to be turned by hand when necessary. When not required, the means provided for adjusting the speed while the motor is running may be omitted.

In the example shown in Figs. 5 and 6, in which the speed governor is adapted for use with a series wound electric motor 12* having a resistance $12^a$ in series with the motor, the spring blade 4 carrying the centrifugal weight 5 is fixed to the portion of the rotary member 1 that is at that side of the gap 3 remote from the portion fixed to the driving shaft 2, so that when the speed of the motor falls below the predetermined speed, the movable contact 7 carried by the inwardly extending arm 6 of the spring blade will be caused by the inward movement of such blade and weight, to bear against the relatively stationary contact 9 and short circuit the resistance 12ª and bring about an increase in speed of the motor, and when the speed exceeds the predetermined speed, the weight 5 under the action of centrifugal force, will cause the movable contact 7 to move away from the contact 9 and open the short circuit of the said resistance 12ª so as to bring about a decrease in speed of the motor.

What we claim is:—

1. A speed governor comprising a rotary body, a spring blade, clamping means whereby one end portion of said blade is clamped to said body, a weight fixed to the free end portion of said blade and extending nearly to said clamping means so as to leave only a short length of spring blade between it and said clamping means, an electric contact carried by and arranged co-axially with said rotary body, an arm fixed to and extending substantially at right angles from the weighted portion of said spring blade, and a second contact carried by said arm and arranged opposite to the first mentioned electric contact.

2. A speed governor comprising a rotary body, a spring blade, a clamping plate between which and said body, one end portion of said spring blade is clamped and which overlaps the outer side of an unsupported portion of said spring blade, a weight fixed to the outer side of the free end portion of said blade and extending nearly to the free end of the overlapping portion of said clamping plate so as to leave a short free portion of the blade between the adjacent ends of said plate and weight, an electric contact carried by and arranged co-axially with said rotary body, an arm fixed to the weigthed portion of said blade and extending substantially at right angles therefrom towards the axis of said body, and a second electric contact carried by said arm and arranged opposite to the first mentioned contact.

3. A speed governor comprising a rotary cylindrical body, a spring blade, a clamping plate between which and said body one end portion of said spring blade is clamped, and which overlaps an unsupported portion of said spring blade, a weight fixed to the outer side of the free end portion of said spring blade and extending nearly to the free end of the overlapping portion of said clamping plate, a contact carried by and arranged co-axially with said rotary body, a contact carried by the weighted end of said spring blade and movable in relation to said first mentioned contact and two insulated contact rings carried by said body and electrically connected to the respective contacts.

4. A speed governor comprising a rotary body, a spring blade fixed at one end to said body, a weight fixed to the free end portion of said blade, said combined blade and weight being arranged to move, under the action of centrifugal force, in a direction towards and from the longitudinal axis of said body, an endways adjustable electric contact carried by said body, normally stationary in relation thereto and arranged at the axis thereof, a second electric contact arranged opposite the first mentioned contact and carried by said combined spring blade and weight so as to be movable therewith, and adjusting means arranged co-axially with said body and whereby the first mentioned contact can be adjusted endways whilst said body is rotating.

5. A speed governor comprising a rotary body, a spring bade fixed at one end to said body, a weight fixed to the free end portion of said blade, said combined blade and weight being arranged to move under the action of centrifugal force in a plane containing the axis of said body, a contact carried by and arranged co-axially with said body, a second contact arranged opposite said first mentioned contact and carried by said combined spring blade and weight and adjusting means for the co-axially arranged contact, comprising an axially arranged screw threaded rod connected to the said contact and adapted to be turned by hand, a rotary nut fitted to said rod and adapted to be held by the hand, means for preventing axial movement of said nut, and means for pressing said nut into frictional engagemeent with said body so that it will rotate therewith when not held by hand, the adjacent faces of the rotary body and nut being flat and smooth and in a plane at right angles to the axis of said body.

6. A speed governor comprising a rotary body, a spring blade fixed at one end to said body, a weight fixed to the free end portion of said blade, said combined blade and weight being arranged to move, under the action of centrifugal force, in a direction towards and from the longitudinal axis of said body, oppositely disposed electric contacts carried by said body, arranged at the axis thereof, and electrically connected together, and a third electric contact arranged between the said co-axially arranged contacts and connected to the combined spring blade and weight, said third contact resting against one of the co-axial contacts, when said body is at rest and adapted to be moved towards the second co-axial contact by the combined spring blade and weight, by the action of centrifugal force, when said body is rotated.

7. A speed governor comprising a cylindrical body adapted at one end to be fixed to a driving shaft and formed at an intermediate portion of its length with a transverse gap, a spring blade fixed at one end to the body at one side of the gap therein, a weight fixed to the free end portion of said blade, said combined blade and weight being adapted, under the action of centrifugal force, to move in a plane containing the axis of said body, an electric contact located in said gap at one side thereof, carried by said body and arranged co-axially therewith, an arm fixed to the free end portion of said spring blade and extending into said gap, and a second electric contact arranged opposite the first mentioned contact, and carried by arm.

8. A speed governor according to claim 7, wherein there are associated with the co-axially arranged contact, means whereby it can be adjusted endways in relation to said body and second contact.

9. A speed governor according to claim 7, wherein the rotary body is provided with a second co-axially arranged contact against which the contact connected to the spring blade bears, when the body is at rest.

10. A speed governor comprising a rotary cylindrical member adapted at one end portion thereof to be fixed to a driving shaft and formed at an intermediate portion of its length with a transverse gap, a spring blade one end portion of which is fixed to said rotary member at one side of said gap, a weight fixed to the free end portion of said blade and movable therewith towards and from said rotary member, an axially arranged endways adjustable contact located in said gap at the opposite side thereof to that at which the spring blade is fixed to said rotary member and carried by said member, a second contact arranged opposite the first one, an arm extending into said gap, connected to the free end portion of said blade and to which said second contact is fixed, means adapted to adjust the first mentioned contact endways in relation to said rotary member and second contact, whilst said member is rotating, a second co-axially arranged contact carried by said body and against which the said contact carried by said arm bears when the rotary member is at rest, and insulated contact ring carried by said rotary member and one of which is electrically connected to the two co-axially arranged contacts and the other is electrically connected to the contact carried by said arm.

Signed at Geneva, Switzerland, by FREDERICK GEORGE CREED, this 20th day of December, 1926, and signed at Croydon, England, by REGINALD DENNIS SALMON, this 30th day of December, 1926.

FREDERICK GEORGE CREED.
REGINALD DENNIS SALMON.